United States Patent [19]

Goodman, Jr. et al.

[11] 4,277,789
[45] Jul. 7, 1981

[54] MICROWAVE ENERGY TRANSMISSION SYSTEM FOR AROUND-THE-MAST APPLICATIONS

[75] Inventors: Robert M. Goodman, Jr.; William J. Dittman, both of Marietta, Ga.

[73] Assignee: Georgia Tech Research Institute, Atlanta, Ga.

[21] Appl. No.: 61,511

[22] Filed: Jul. 27, 1979

[51] Int. Cl.³ ............................................ H01Q 1/28
[52] U.S. Cl. .................... 343/708; 343/762; 333/261
[58] Field of Search ............... 333/108, 261; 343/705, 343/708, 762

[56] References Cited

U.S. PATENT DOCUMENTS

| | | | |
|---|---|---|---|
| 2,563,990 | 8/1951 | Cutler | 343/777 |
| 2,809,370 | 10/1957 | Pinnell | 343/762 |
| 2,841,770 | 7/1958 | Hollis | 333/106 |
| 3,026,513 | 3/1962 | Kurtz | 343/7.4 |
| 3,058,107 | 10/1962 | Danielson | 343/100 |
| 3,066,291 | 11/1962 | Alford | 343/106 |
| 3,108,235 | 10/1963 | Bowman | 333/1 |
| 3,117,291 | 1/1964 | Kinkead | 333/1 |
| 3,123,782 | 3/1964 | Parisi | 333/257 |
| 3,127,579 | 3/1964 | Smith | 333/256 |
| 3,213,458 | 10/1965 | Hansel et al. | 343/876 |
| 3,230,535 | 1/1966 | Ferrante et al. | 343/762 |
| 3,524,192 | 8/1970 | Sakiotis et al. | 343/854 |
| 3,792,474 | 2/1974 | Meek et al. | 343/756 |
| 3,795,004 | 2/1974 | Meek et al. | 343/761 |
| 3,803,619 | 4/1974 | Meek et al. | 343/761 |
| 3,852,762 | 12/1974 | Henf et al. | 343/756 |
| 3,896,446 | 7/1975 | Kondoh et al. | 343/705 |

Primary Examiner—Eli Lieberman
Attorney, Agent, or Firm—Newton, Hopkins & Ormsby

[57] ABSTRACT

A microwave energy transmission system for coupling a stationary waveguide to a rotating waveguide including a transition coupling assembly comprising a plurality of equal length transmission lines having their opposite ends terminating in annular patterns defining equidistantly, circumferentially spaced regions of maximum coupling, and a pair of rotatable horns having flared apertures sweeping circular paths in gapped registry with the annular patterns and spanning, at any instant, a plurality of said regions.

13 Claims, 4 Drawing Figures

MICROWAVE ENERGY TRANSMISSION SYSTEM FOR AROUND-THE-MAST APPLICATIONS

BACKGROUND OF THE INVENTION

In situations wherein several antennas are disposed vertically above each other on a common mast support and the antennas are required to rotate about the center line of the mast in order to eliminate blockage of microwave energy by the mast, it is necessary to couple a stationary transmission line fixed to the mast to the rotating antenna assembly.

The problem of coupling a relatively stationary microwave transmission line section to a transmission line section rotating relative thereto may create restrictions in power and bandwidth and may result in periodic variations in power (i.e., introduces "wow") due to the relative rotation. These problems may arise in a rotating antenna feed system.

BRIEF SUMMARY OF THE INVENTION

This invention minimizes the above problems, allowing high power, wide-band microwave transmission with minimal power variation due to relative rotation. Basically, this is achieved by providing the waveguide section which is rotating with a sectoral horn which sweeps a circular path about the rotation axis and by providing the relatively stationary waveguide section with a sectoral horn which rotates about a parallel, offset axis and sweeps a second circular path about that axis, by providing a transition means which forms a plurality of equal length transmission lines terminating at their opposite ends in circularly arrayed maximum coupling regions registering with the respective paths swept by the horns, and by causing the horns to rotate synchronously in fixed angular relation to the regions of maximum coupling. Each horn spans a plurality of such regions at any instant.

The transmission lines of the transition means may be coaxial lines or they may be rectangular waveguide sections.

This invention is useful in a novel application for helicopters whereby an antenna coaxial with the rotor is coupled with a waveguide section which is stationary with respect thereto.

BRIEF DESCRIPTION OF THE DRAWING FIGURES

DETAILED DESCRIPTION OF THE INVENTION

Figure 1:
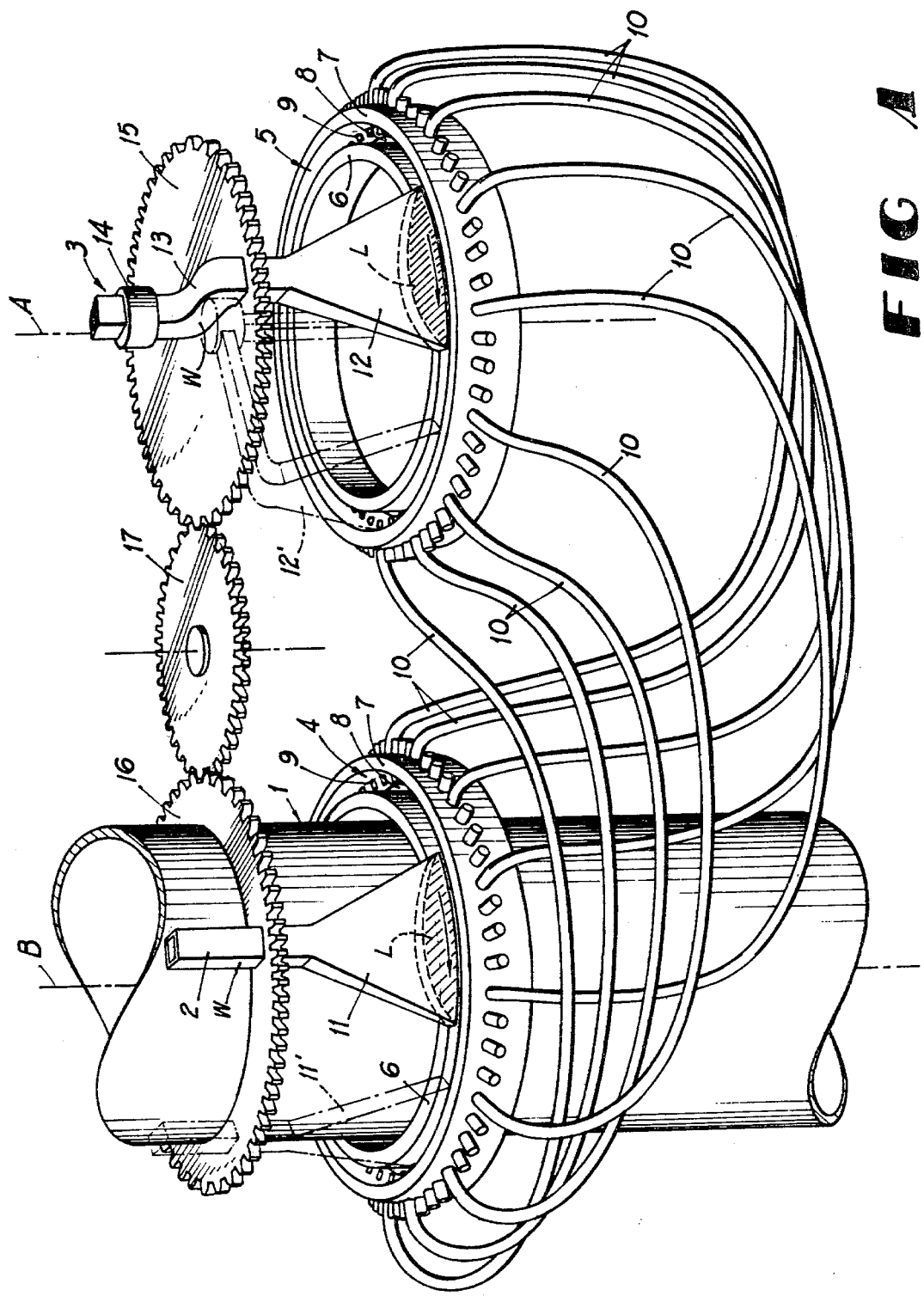
FIG. 1 is a perspective view of one embodiment of the invention using coaxial lines for the transition means.

Basic principles of the invention will become evident from FIG. 1 wherein certain of the components are incompletely shown for the sake of clarity. An antenna mast 1 is provided with conventional means (not shown) for rotating it about its longitudinal axis B and, as is conventional, the mast carries antenna structure (not shown) with which the remote end of a transmission line section 2 is coupled. The transmission line 2 is disposed externally of the mast 1 and rotates with it, thereby to couple microwave energy to and from the associated antenna element.

The transmission line section 3 extends along the axis A which is offset and parallel to the axis B and is adapted to conduct microwave energy, for example from a transmitter or to a receiver, and forms with the section 2 part of the main transmission line coupled with the antenna.

The manner in which these line sections are coupled to handle wide bandwidth, high power energy without the introduction of power variations or "wow" is the subject matter of this invention. In the embodiment of FIG. 1, two stationary, parallel plate annular cavities 4 and 5 are provided, each concentric with the respective axes B and A. Each consists of an inner circular plate 6 and an outer circular plate 7, these two plates being joined by a bottom wall 8 so that their free edges define a circular coupling mouth. An array of coaxial lines 10 is provided to effect transition between the two parallel plate cavities. Each coaxial line comprises an inner conductor whose opposite ends project through the outer walls 7 of the parallel plate cavities to provide the probes 9, whereas the outer conductors 10 join such outer walls 7, as shown. These coaxial lines are circumferentially and uniformly spaced so that the opposite ends of the individual coaxial lines forming the array are in the identical angular pattern for each cavity. The waveguide section 2 terminates in a horn 11 which flares to a coupling port end gapped with respect to the associated parallel plate cavity but spanning a circumferential arc thereof which encompasses a number of probe positions. Similarly, the waveguide section 3 is provided with a feed horn 12, joined through the radial arm 13 to the rotatable coupler 14 concentric with the axis A. The arm 13 is carried by a gear 15 rotatable about the axis A and in driving connection with a gear 16, carried by the antenna mast 1, through the intermediary of an idler gear 17. At any instant, the two feed horns are in the same angular registry with the probe ends of the individual coaxial lines and this angular alignment is maintained by the interconnecting gear train.

Alternative constructions to that shown in FIG. 1 are, of course, possible. The coaxial array patterns need not be arranged in a complete circle, nor need they be of the same diameter. For instance, the array 10 associated with arm 13 may be a circle as shown but the array associated with wave guide section 2 may be of limited arcuate length if the antenna assembly were not required to operate through other than a limited sector. As long as the gearing assembly is chosen to assure synchronization between the horns such that they are at all times aligned with the opposite ends of specific individual coaxial lines, then a complete, repetitive energy path will be maintained.

All of the coaxial lines are of the same length and adjacent probes are spaced approximately one-quarter to three-eights wavelength apart to optimize coupling between probes. Each probe projects radially toward the inner plate to terminate at a point approximately midway between the inner and outer plates. Also, each probe is parallel to and spaced from the back wall of the cavity by approximately one-quarter wavelength in order to reflect energy in phase with that propogated away from the back wall. Since the energy so propogated will have an E-vector perpendicular to the parallel plates of the cavities, the waveguide sections joining the horns must have their smaller dimension walls W in this aspect also. This dictates an H-plane flared sectoral horn (in long dimension) in order for each horn to couple a number of probes concurrently with minimal fluctuations of the level of energy coupled due to relative movement between horn and probes.

Further, since each individual coaxial line is coupled with different areas of the horns as the horns traverse the probes, the horns must have a linear phase front at their probe-coupling ends. Therefore, corrective means such as a geodesic or dielectric lens L is provided at the probe-coupling end of each horn in order to provide a collimated beam thereat.

Each horn may span as few as about four or as many as about fourteen probes, for example, depending upon power requirements. Power handling capacity of coaxial lines is limited by overheating and since any particular line carries a maximum share of the power only once per revolution (when the centers of the horns are aligned with the probes of a line), the effective duty cycle is reduced. Moreover, since the horns span only a limited number of probes at any instant, further transmission channels may be added, as indicated in dashed lines at 12′ and 11′ in FIG. 1, employing the same transition coupling formed by the parallel plate cavities and coaxial lines.

Figure 2:
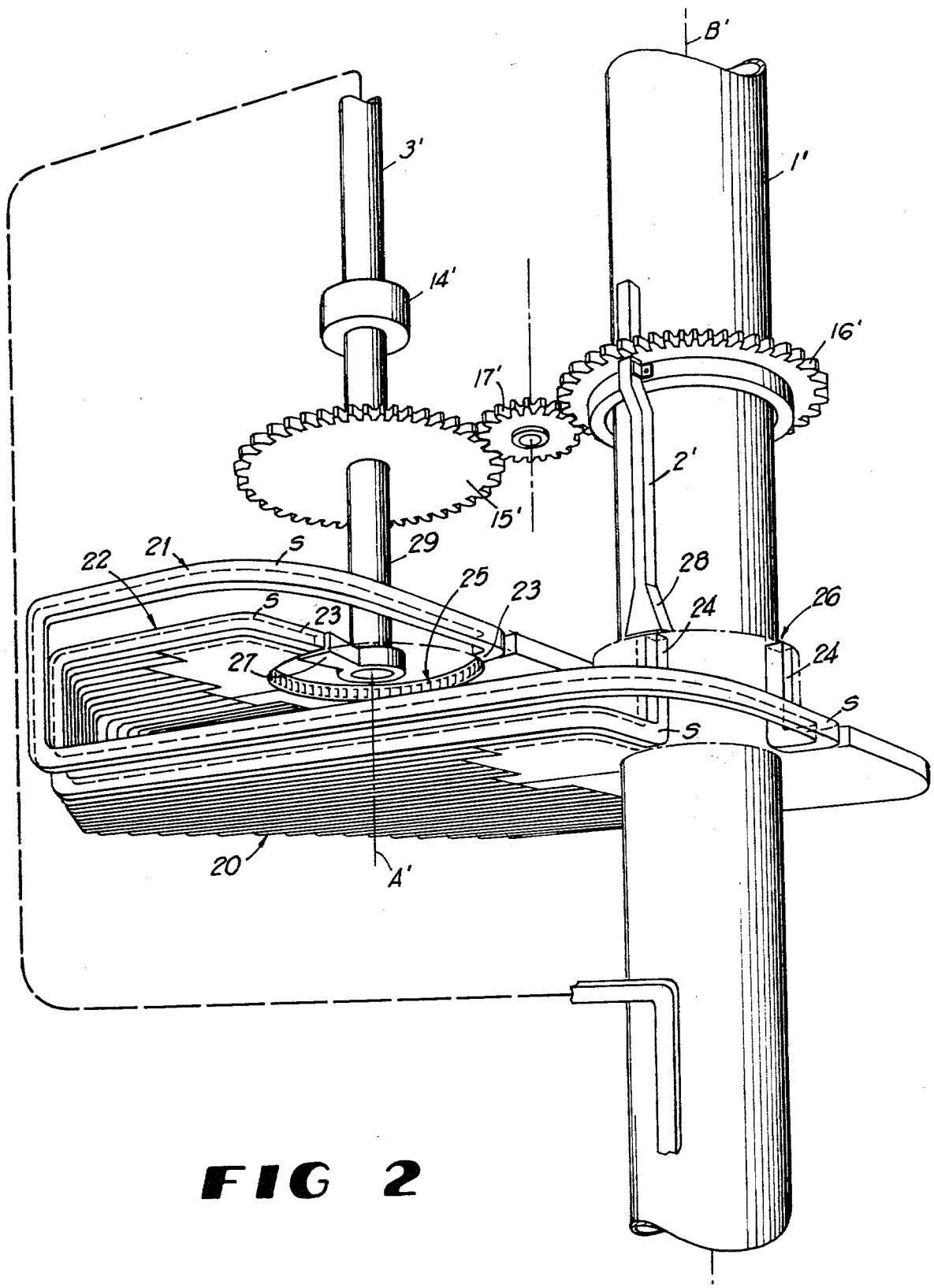
FIG. 2 is a view similar to FIG. 1 but showing the use of rectangular waveguides for the transition means.

FIG. 2 illustrates an embodiment wherein the coaxial lines are replaced by rectangular waveguides 20. Some of these waveguides have been omitted for the sake of clarity and like components with respect to FIG. 1 are indicated by primed, corresponding reference characters. The array of guides 20 is such that each waveguide is of the same length and in order to provide a structurally rigid and compact arrangement, the array is formed of J-shaped profile as shown. Considering the two waveguides 21 and 22 (the waveguides between this pair have been omitted for clarity), each terminates at one end in a radially inwardly projecting portion 23 which is contiguous with similar portions of those waveguides between which it is disposed, whereas the other end terminates in an axially extending portion 24 which, likewise, is contiguous with similar portions of adjacent waveguides. The portions 23 define an annular pattern 25 of adjacent, radially inwardly facing coupling ports whereas the end portion 24 define an annular pattern 26 of axially facing coupling ports. Since the energy is propogated in the $TE_{10}$ mode (i.e., the dominant wave having the electric plane parallel to the short dimension of the waveguide), the waveguides 20 must have their longer dimension walls S disposed in contiguous relation, as shown, in order to assure that the $TE_{10}$ or E-vectors of all the waveguides lie in a common plane at the coupling ports. This allows good impedance matching across the gap between the coupling ports and the scanning horns 27, 28 when the latter are $TE_{01}$ flared E-plane sectoral horns. As before, the horns illuminate or are illuminated by a plurality of waveguide apertures at the respective coupling port arrays 25 and 26.

The scanning horn 27 extends radially with respect to the axis A′ and is connected with an axially extending waveguide section 29 rotating with the gear 15′. Thus, the horn 27 corresponds to the horn 12 of FIG. 1. Likewise, the horn 28 is connected to the lower end of the waveguide section 2′ and rotates with the antenna, thereby corresponding to the horn 11 of FIG. 1. However, the waveguide sections to which the horns 27 and 28 are joined are so oriented that the horns flare perpendicular to the direction of the longer walls thereof.

Figure 3:
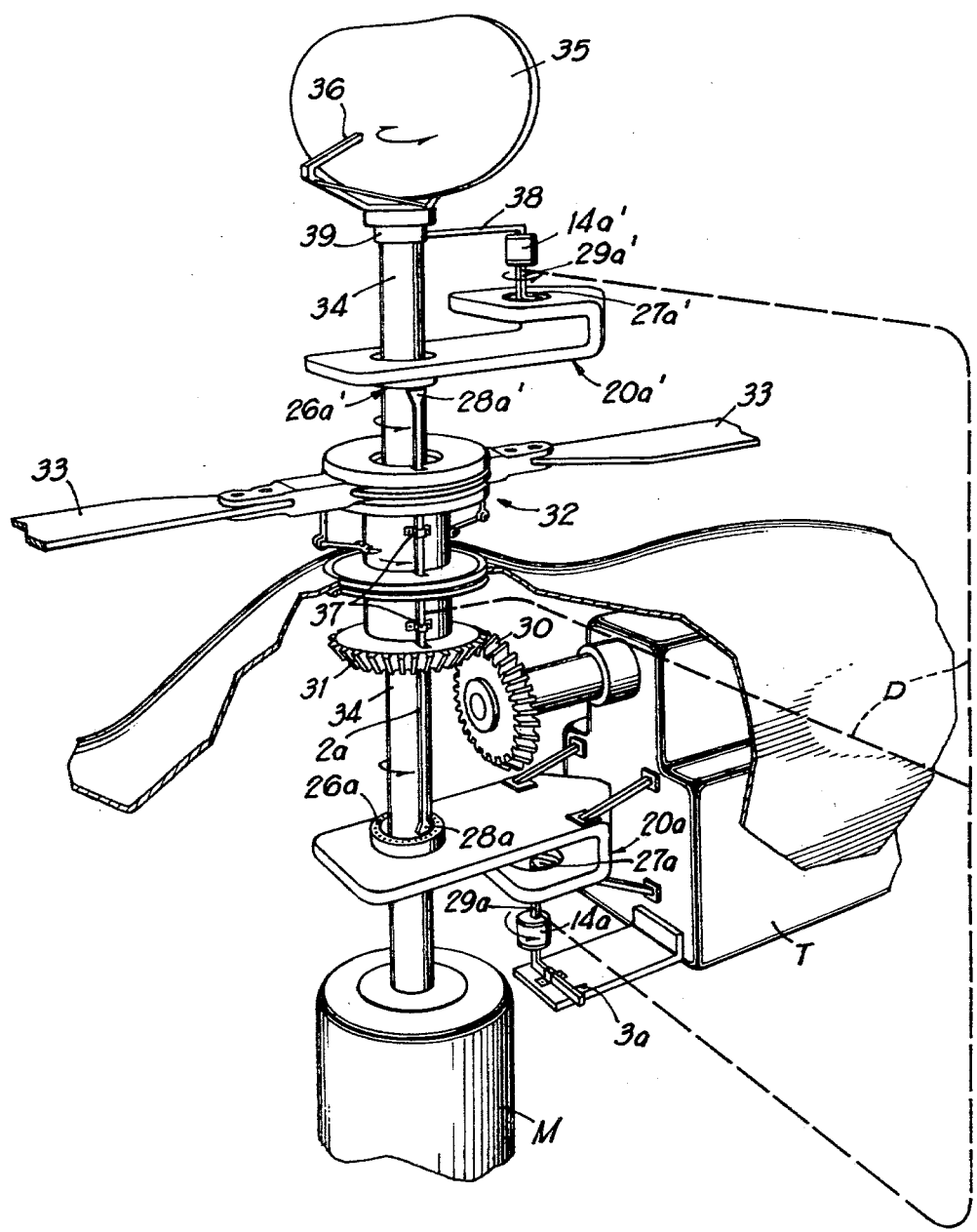
FIG. 3 is a perspective view showing a novel application of the invention to a helicopter.

FIG. 3 illustrates a novel application of the invention. Illustrated is a portion of a helicopter blade assembly and drive therefor. The usual transmission T has a bevel gear output drive at 30 meshing with the bevel gear 31 which unidirectionally rotates the rotor assembly 32. The blades 33 are carried by the rotor hub in the usual manner for cyclic and pitch control relative thereto. An antenna shaft 34 projects axially through the rotor hub 32 and is independently rotated at a desired speed and direction, relative to the rotor hub, by means of the drive motor M. The shaft 34 carries the antenna dish 35 and the feed member 36, as shown.

Two of the assemblies of FIG. 2 are used in this embodiment. Thus, a first rotatable coupler 14a couples the main waveguide 3a to the waveguide section 29a joined to the horn 27a and, through the transition waveguide assembly 20a which is fixed relative to the airframe, to the horn 28a at the lower end of the guide section 2a. The waveguide 2a is fixed, as at 37, to the rotor hub so that the horn 28a scans the aperture array 26a in synchronization with rotor speed and direction. The upper end of the section 2a terminates in a second horn 28a′ which similarly scans the aperture array 26a′ of the second transition section 20a′. The second horn 27a′ and its section 29a′ are coupled through a further rotatable coupler 14a′ to the fixed waveguide section 38 which is coupled, through a third rotatable coupler 39, to the foresaid antenna feed 36. The two horns 27a and 27a′ may be connected for synchronous rotation with the rotor hub 32, as indicated by the dashed lines D, or the horns 27a and 27a′ may be provided with separate drive motors electrically slaved to the rotation of the rotor 32.

As noted above, the low duty cycle of each individual transmission line of the transition assembly allows high power energy to be transferred without the need for pressurization and/or gas filling of this component. The remainder of the system is readily adapted for pressurization and/or gas filling, the various horns being capped for this purpose. This greatly simplifies the sealing problem in the transition gap regions.

Figure 4:
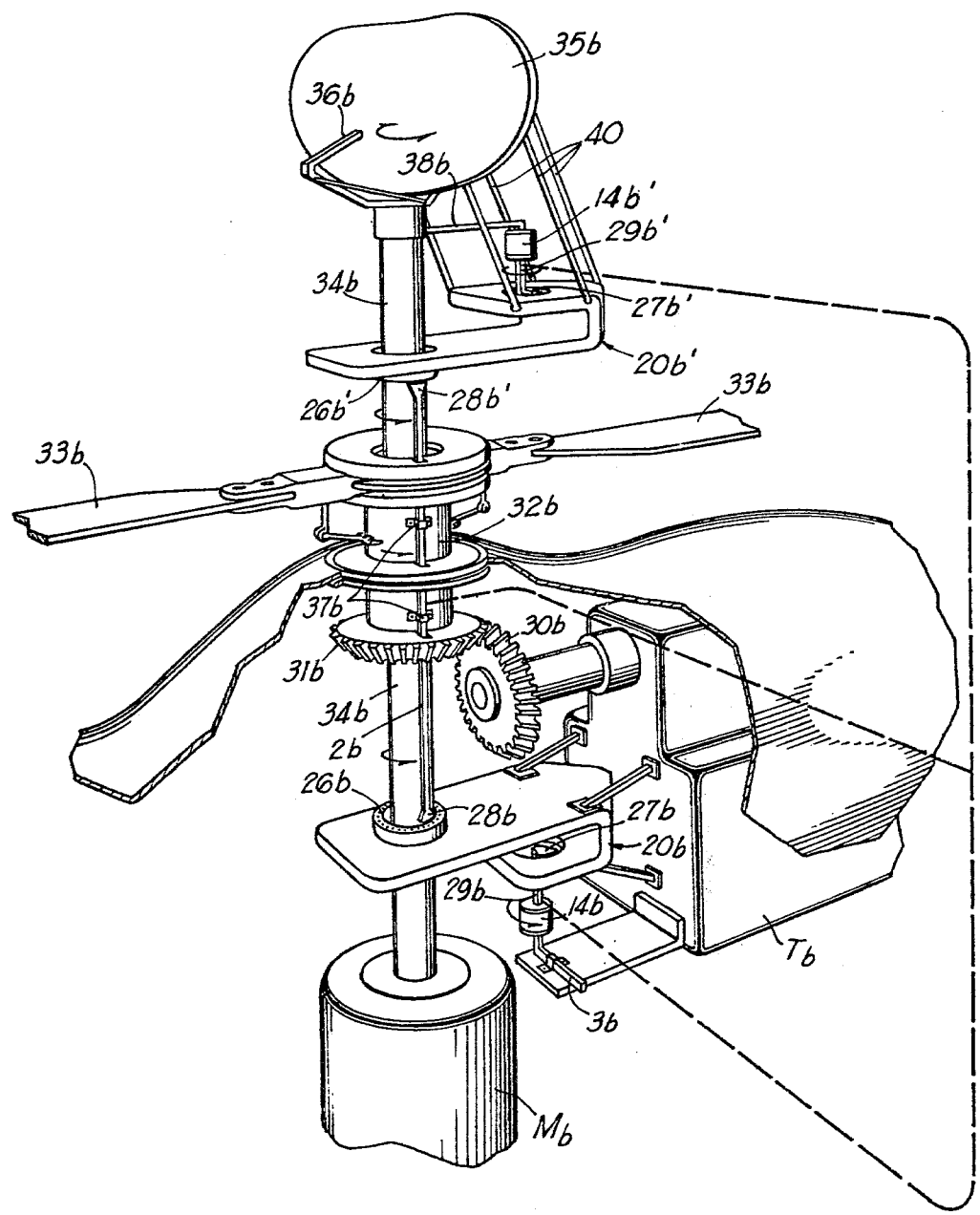
FIG. 4 is a perspective view showing an alternate embodiment similar to FIG. 3.

FIG. 4 shows an alternative construction of the embodiment shown in FIG. 3. In this case all parts and functions are as previously described in respect to FIG. 3 and are indicated by subscript b. However, the upper transition section 20b′ is fixedly attached to the antenna 35b by means of struts 40 and rotates with it about the center line of mast 34b independently of the rotation of rotor assembly 32b. As before, upper horn 29b′ maintains exact radial alignment with upper horn 28b′ at all times, so that energy conducted into any particular transmission line segment of transition section 20b′ from horn 28b′ is fed through such line segment to upper horn 29b′ and thence rotary joint 14b′ to the antenna 35b. Allowing the transition section 20b′ to rotate with the antenna 35′ eliminates the necessity for the additional rotary joint 39 of FIG. 3, as well as a nonrotatable coaxial shaft (not shown) between antenna mast 34 and rotor assembly 32 of FIG. 3 necessary to support upper transition section 20a′ in a fixed position.

What is claimed is:

1. In a microwave energy transmission system including a member rotatable about a given axis and a first transmission line section carried by and rotatable with said member, and a further transmission line section which is stationary with respect to said member, the improvement comprising means for coupling said transmission line sections to transmit high power microwave energy without producing "wow"; said means comprising a first horn carried by said first section and having a flared aperture sweeping an arcuate path centered about said given axis, a second horn rotatably connected to said further section about a second axis non-coincident with said given axis and having a flared aperture adapted to sweep a sectored path centered about said second axis, and transition means for establishing a plurality of identical length transmission paths having opposite ends in spaced registry with corresponding equidistantly spaced circumferential points of said arcuate paths swept by said first and second horns; and means for causing said horns to sweep such corresponding points in synchronous fashion, the flared aperture of each horn being dimensioned to span a plurality of said points at any instant.

2. In a microwave energy transmission system as defined in claim 1 wherein said transition means comprises a pair of parallel plate cavities each having concentric inner and outer walls defining an annular gap in registry with a corresponding circular path, and a plurality of coaxial lines defining said identical length transmission paths, each coaxial line comprising an outer conductor extending between and joining said outer walls and an inner conductor having its opposite ends projecting radially between said inner and outer walls to define probes thereat.

3. In a microwave energy transmission system as defined in claim 2 wherein said member is an antenna mast.

4. In a microwave energy transmission system as defined in claim 2 including means at the aperture of each horn for collimating the microwave energy.

5. In a microwave energy transmission system as defined in claim 4 wherein each probe terminates approximately mid-way between the corresponding inner and outer walls.

6. In a microwave energy transmission system as defined in claim 5 wherein adjacent probes are spaced apart about ¼ to ⅜ of the wavelength of the microwave energy.

7. In a microwave energy transmission system as defined in claim 1 wherein said transmission paths are defined by a corresponding plurality of rectangular waveguides having their opposite ends disposed in contiguous relation in circular patterns in registry with the corresponding circular paths swept by said horns.

8. In a microwave energy transmission system as defined in claim 7 wherein said waveguides, at one end, terminate in radially inwardly facing ports arranged in a circular pattern and, at the opposite end, in axially extending portions arranged in a circular pattern and defining a circular pattern of axially facing ports arranged in a common plane.

9. In a microwave energy transmission system as defined in claim 8 wherein said waveguides are oriented such that their longer dimension walls are contiguous at said ports.

10. In a microwave energy transmission system as defined in claim 9 wherein each horn is a $TE_{01}$ flared E-plane sectoral horn.

11. In a helicopter including a rotor assembly having at least one rotor blade attached thereto and means for rotating said rotor, the improvement which comprises an antenna mounted for independent rotation coaxially with and above said rotor blade and including a feed element, a waveguide section fixed relative to said blade therebelow, and means for coupling said waveguide section to said feed element and including a waveguide section non-coaxial with said antenna carried by and rotating said said rotor, said means also comprising a first horn rotatably coupled to the relatively fixed waveguide section, a second horn fixed to one end of the waveguide section carried by said rotor, first transition means coupling said horns, a third horn connected to the opposite end of said waveguide section carried by the rotor, a fourth horn coupled to said feed element, and second transition means coupling said third and fourth horns, said first and fourth horns being rotatable about axes non-coincident with the axis of rotation of said rotor.

12. In a helicopter as defined in claim 11 wherein said fourth horn is rotatably coupled to said feed element.

13. In a helicopter as defined in claim 11 wherein said fourth horn is fixedly coupled to said feed element and said second transition section is fixedly attached to said rotatable antenna.

* * * * *